United States Patent
Polanyi et al.

(10) Patent No.: US 6,866,510 B2
(45) Date of Patent: Mar. 15, 2005

(54) SYSTEM AND METHOD FOR TEACHING SECOND LANGUAGE WRITING SKILLS USING THE LINGUISTIC DISCOURSE MODEL

(75) Inventors: Livia Polanyi, Palo Alto, CA (US); Martin Henk Van Den Berg, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 916 days.

(21) Appl. No.: 09/742,449

(22) Filed: Dec. 22, 2000

(65) Prior Publication Data

US 2002/0083104 A1 Jun. 27, 2002

(51) Int. Cl.[7] .................. G09B 19/06; G09B 19/08; G06F 17/28
(52) U.S. Cl. .................................. 434/157; 704/2
(58) Field of Search .................. 434/157, 156; 704/2, 227

(56) References Cited

U.S. PATENT DOCUMENTS

| | | | | |
|---|---|---|---|---|
| 4,774,666 A | * | 9/1988 | Miyao et al. ................ | 704/2 |
| 4,980,829 A | * | 12/1990 | Okajima et al. ............. | 704/5 |
| 5,384,702 A | * | 1/1995 | Tou ............................ | 704/9 |
| 5,697,789 A | * | 12/1997 | Sameth et al. .............. | 434/157 |
| 6,002,997 A | * | 12/1999 | Tou ............................ | 704/2 |
| 6,275,789 B1 | * | 8/2001 | Moser et al. ................ | 704/7 |
| 6,341,959 B1 | * | 1/2002 | Wen et al. .................. | 434/169 |
| 6,434,518 B1 | * | 8/2002 | Glenn ......................... | 704/3 |
| 6,438,515 B1 | * | 8/2002 | Crawford et al. ........... | 704/5 |

OTHER PUBLICATIONS

U.S. Appl. No. 09/609,325, filed Jun. 2000, Livia Polanyi et al.
U.S. Appl. No. 09/689,779, filed Oct. 2000, Livia Polanyi et al.
U.S. Appl. No. 09/630,371, filed Aug. 2000, Livia Polanyi et al.
Mani, *Machine Learning of Generic and User–Focused Summarization*, 1998.
Barzilay et al., *Using Lexical Chains for Text Summarization*, 1997, p. 10–17.
Polanyi et al., *A Syntactic Approach to Discourse Semantics*, 1984, p. 413–19.
Polanyi et al., *On the Recursive Structure of Discourse*, 1983, p. 141–178.
Eastgate Corp., *Storyspece: A Hypertext Tool for Writers and Readers* p. 1–7 www.eastgate.com/storyspace/StoryspaceOV.html printed on Jun. 12, 2000.
Mani et al., *Multi–Document Summarization By Graph Search and Matching* 1997, p. 622–628.
Marcu *Discourse trees are good indicators of importance in text* 1999, p. 123–136.
Polanyi *The Linguistic Discourse Model: Towards a Formal Theory of Discourse Structure* Nov. 1986 152 p.
Marcu *The Rhetorical Parsing of Natural Language Texts* Jul. 1997, p 96–103.

(List continued on next page.)

*Primary Examiner*—Talivaldis Ivars Smits
*Assistant Examiner*—Myriam Pierre
(74) *Attorney, Agent, or Firm*—Oliff & Berridge, PLC (57) ABSTRACT

A technique for teaching second language writing skills provides for analyzing a user text. The user text is analyzed and compared to a writing culture. The differences between the user text and the writing culture are identified. The identified differences are compared to linguistic flaw information previously compiled from other second language texts written by first language writers in the writing culture. Identified differences that are found in the linguistic flaw information store are used to retrieve contextually relevant corrections and comments for addressing the identified flaws based on the first and second language and writing culture.

11 Claims, 8 Drawing Sheets

OTHER PUBLICATIONS

Hovey et al., *Automated Text Summarization in Summarist* Aug. 8, 1997.

Polanyi *The Linguistic Structure of Discourse*, Technical Report Center for the Study of Language and Information, Standford University, Nov. 1996 p 3–26.

Connor, *Contrastive Rhetoric Cross–cultural aspects of second–language writing*, Cambridge University press, pp. 14–25, 1996.

Maynard, *Principles of Japanese disclosure: A handbook*, Cambridge University Press, pp. 23–98, 1998.

* cited by examiner

| STRUCTURAL REPRESENTATION OF DISCOURSE FOR THE FLAW | FIRST LANGUAGE | SECOND LANGUAGE | WRITING CULTURE | CORRECTIONS | COMMENTS |
|---|---|---|---|---|---|
| STRUCTURAL REPRESENTATION OF DISCOURSE - A | JAPANESE | ENGLISH | EXPOSITORY | NODE LEVEL DEPTH NOT DEEP ENOUGH | REPHRASE PARAGRAPH TO HELP READER FOLLOW EACH STEP |
| STRUCTURAL REPRESENTATION OF DISCOURSE - C | ENGLISH | JAPANESE | EXPOSITORY | NODE LEVEL TOO DEEP | REPHRASE PARAGRAPH, ALLOW READER TO DEDUCE THE NECESSARY STEPS |

FIG. 3

| TEXT BUILDING UNIT IDENTIFIER | TEXT BUILDING UNIT |
|---|---|
| 1A | WHEN |
| 1B | WE FIND DISCONTENT AND WEARINESS INSIDE OUR HEAD |
| 1C | WE INADVERTENTLY SAY THINGS TO OURSELVES |
| 2A | WHY DO WE MUMBLE TO OURSELVES ? |
| 3A | IT IS BECAUSE |
| 3B | BY MUMBLING TO OURSELVES |
| 3C | WE SOMETIMES CALM EMOTIONS DOWN A LITTLE |
| 4A | WHEN ANGRY |
| 4B | WE SOMETIMES KICK AT STONES |
| 4C | AND CALM OUR NERVES |
| 5A | THIS IS A COMPENSATORY ACT |
| 5B | WHICH CHANNELS ANGER INTO THINGS |
| 5C | THIS RELEASES ONE'S FEELINGS. |
| 6A | THIS UNCONSCIOUS COMPENSATORY ACT IS LIFE'S WISDOM |
| 6B | GIVEN TO HUMAN BEINGS. |

| TEXT BUILDING UNIT IDENTIFIER | TEXT BUILDING UNIT |
|---|---|
| 1A | IN OLDEN TIMES |
| 1B | COPYING INFORMATION BY HAND |
| 1C | WAS NECESSARY |
| 2A | SOME MISTAKES WERE MADE |
| 3A | COPYING MACHINES MADE IT POSSIBLE |
| 3B | TO MAKE QUICK AND ACCURATE COPIES |
| 4A | TRAVELING BY CAR IS CONVENIENT |
| 4B | BUT |
| 4C | ONE HAS LITTLE IMPRESSIONS OF LOCALITIES |
| 5A | WALKING |
| 5B | MAKES IT POSSIBLE TO ENJOY LOCALITIES FURTHER |
| 6A | ALTHOUGH |
| 6B | COPYING MACHINES ARE CONVENIENT |
| 6C | COPYING BY HAND |
| 6D | IS SOMETIME BETTER |
| 7A | INFORMATION REMAINS IN ONE'S MEMORY LONGER |
| 7B | AND CAN BE USED LATER. |

SYSTEM AND METHOD FOR TEACHING SECOND LANGUAGE WRITING SKILLS USING THE LINGUISTIC DISCOURSE MODEL

BACKGROUND OF THE INVENTION

1. Field of Invention

This invention is related to machine facilitated instruction.

2. Description of Related Art

Second-language skills have become increasingly important as lower communication costs have fostered increased communication between countries. However, native language writers of a first language frequently have difficulty mastering writing skills in a second language, even after completing advanced levels of instruction. Furthermore, developing advanced writing skills in a second language requires developing a mastery of subject-specific text genres or writing cultures.

For example, English-language medical journals and English-language legal texts deliver information to the reader in specific ways. Thus, a student writer must learn to master not only the format of the second-language general text genres, but must also master the use of subject-specific genres or writing cultures within the second language as well. Texts that fail to conform to the expected writing culture are often perceived as disorganized and/or awkward.

The language instruction is also more readily absorbed and integrated by a student if the overall aim of the lesson is clearly understood. Thus, an understanding of the overall nature of the flaws in the language-specific writing culture text and an overview of the techniques useful in correcting such flaws would be advantageous.

SUMMARY OF THE INVENTION

This invention provides systems and methods for specifying a first or native language of a user, a second language in which the user desires to master writing skills and a writing culture which describes the type of writing to be mastered.

The invention separately provides systems and methods that allow a student of a second language to both understand similarities while also highlighting differences between a first and a second language writing culture.

A number of first language texts written by first-language speakers is analyzed by writing culture to generate normative features of the first language writing culture. A structural representation of discourse is then generated to reflect these features. A second group of texts written by native first-language speakers writing in the second language is analyzed for trends in the types of flaws. The flaws are organized by first and second language and writing culture. In this way, the typical flaws for first-language writers writing in the second-language writing culture are easily identified.

The user's text is then analyzed with respect to a representative structural representation of discourse for the second-language writing culture. The differences are identified. The writing flaws associated with first-language learners of the second-language writing culture are compared to the identified differences in the structural representation of discourse for the user's text. An explanation of each identified flaw is displayed. The first-language and second-language writing-culture-specific suggestions for correcting each identified flaw, graphical visualizations and textual explanations of the similarities and differences of the structural representations of discourse may also be displayed.

In various exemplary embodiments, the second language text analysis systems and methods according to this invention use the Linguistic Discourse Model, although other theories of discourse may also be used. In various other exemplary embodiments according to this invention, the user analyzes a second language text that is translated from a first language text having a first writing culture. Flaws in the second language translated document may then be identified.

These and other features of and advantages of this invention are described in, or are apparent from, the following detailed description of various exemplary embodiments of the systems and methods according to this invention.

BRIEF DESCRIPTION OF THE DRAWINGS

The invention will be described with reference to the accompanying drawings, in which like elements are labeled with like numbers, and in which.

DETAILED DESCRIPTION OF EXEMPLARY EMBODIMENTS

Figure 1:
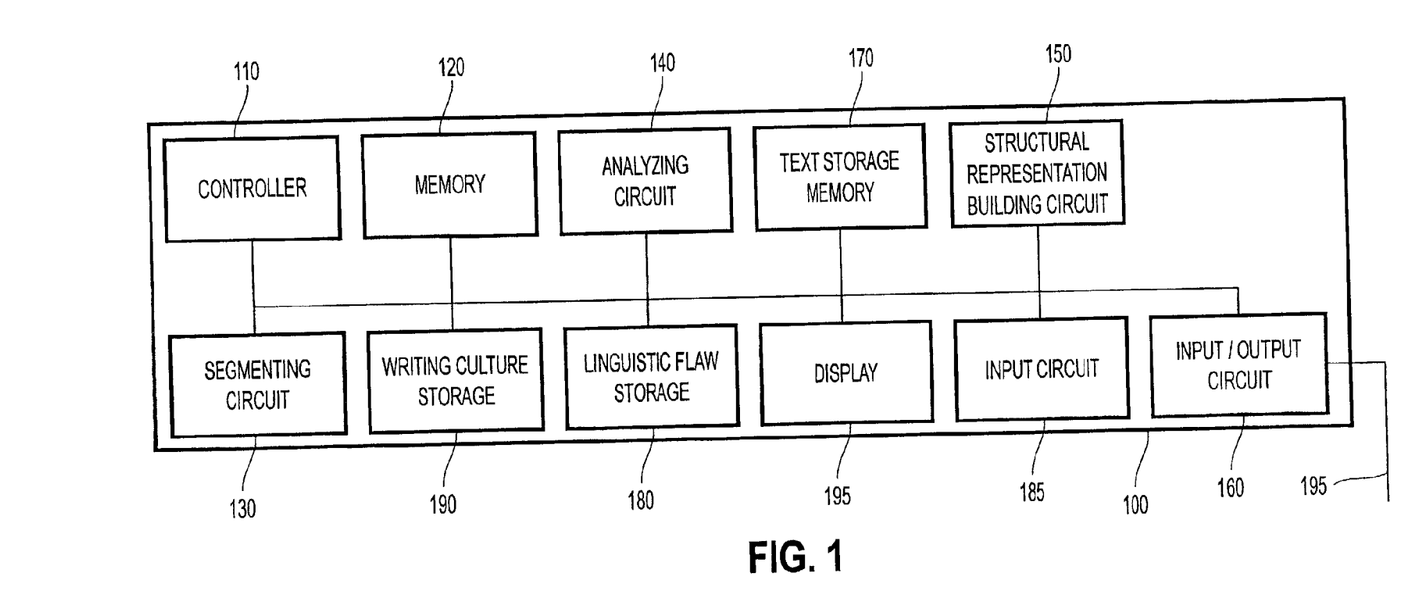
FIG. 1 shows a block diagram of an exemplary embodiment of a second-language writing-skills-instruction system according to this invention.

FIG. 1 shows an exemplary embodiment of a second language writing skills instruction system 100 according to this invention. The second language writing skills instruction system 100 includes a controller 110, memory 120, a segmenting circuit, manager or routine 130, an analyzing circuit, manager or routine 140, a structural representation building circuit, manager or routine 150, a text storage memory 170, a linguistic flaw storage 180, an input circuit 185, a writing culture storage 190 and a display 195 connected via input/output circuit 160, to a communication link 195.

The controller 110 loads user text from the text storage memory 170 into the memory 120. The text storage memory 170 may be any known or later developed device or structure that is able to store text, such as CD-ROM, magnetic disk, floppy disk, ROM, battery backed RAM and the like. The text is segmented into text building units by the segmenting circuit, manager or routine 130. The text building units are analyzed by the analyzing circuit, manager or routine 140 and provided as input to the structural representation of discourse building circuit, manager or routine 150 to create a structural representation of discourse from the user text. The segmentation, analysis and structural representation building processes are more fully described in co-pending U.S. patent application Ser. Nos. 09/609,325, 09/630,371 and 09/689,779, each incorporated herein by reference in its entirety.

The controller 110 compares the user text to previously-stored structural representations of discourse stored in the writing culture storage 190 and specified by the user. The controller 110 identifies the salient differences between the structural representation of discourse and the user text. The differences are compared to flaws previously identified among other first-language writers in the second language and previously stored in the linguistic flaw storage 180. The problems are identified using any known or later-developed technique that matches associated structural representations of discourse for the flaws against elements of the structural representation of discourse for the user text.

When a flaw is identified, a more-appropriate structural representation of discourse for the language and writing culture is also retrieved. In this way, learning a second language writing culture is facilitated by exploiting the user's knowledge of the user's first-language writing culture. The second-language writing culture is then compared and contrasted with the first-language writing culture. Moreover, visualizing of at least one structural representation of discourse provides the user with an overview of the changes needed in terms of the writing culture of the user's first language. The user can then identify the changes needed to conform the user text to the structural representation of discourse expected in the second-language writing culture. The user therefore gains both macro-level and micro-level understanding of the changes necessary to allow the user's writing to be better understood in the second-language writing culture.

Figure 2:
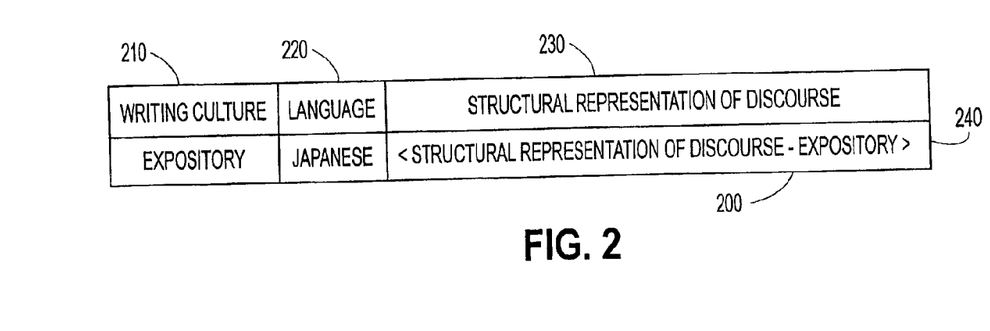
FIG. 2 shows an exemplary embodiment of a writing-culture data storage structure according to an embodiment of this invention.

FIG. 2 shows an exemplary writing culture data structure 200 of the writing culture storage 190. The writing culture data structure 200 includes a writing culture identifier 210, a language identifier 220 and a structural representation of discourse identifier 230 for the identified writing culture and/or the identified language.

The writing culture identifier 210 identifies the type of writing that is being analyzed. For example, expository writing in a first language might have different development strategies than expository writing in a second language. These different development strategies can be identified through analyzing the structural representation of discourse of a large number of exemplary expository writing texts. The common elements for a specific writing culture, such as legal or expository writing can thus be identified. Expository writing in various languages is further discussed in Principles of Japanese Discourse, Maynard, Senko Cambridge University Press, 1998, and Contrastive Rhetoric, Connor, Ulla, Cambridge University Press, 1996, each incorporated by reference in its entirety.

The language identifier 220 identifies the language associated with the text. The language identifier 220 and the writing culture identifier 210 together identify a structural representation of discourse 230 that reflects the language and writing culture. For example, in an entry 240 of the exemplary writing culture data structure 200, the writing culture 210 is indicated as Expository writing. In this entry 240, the language identifier portion 220 indicates that the English language is being used. The structural representation of discourse 230 portion of this entry contains a structural representation of discourse of the indicated language and writing culture. However, it should be appreciated that any technique for representing the structure of discourse that allows the structure of multiple texts to be compared may be used in the practice of this invention.

The exemplary writing culture storage data structure 200 of the writing culture storage 190 is used to identify the features of a writing culture through the associated structural representation of discourse 230 for the writing culture. These features are compared against the user's text stored in the memory 20. The differences between the writing culture structural representation of discourse 230 and the user's text, are identified as problems in the user's written text. These problems are then displayed and explained.

Figure 3:
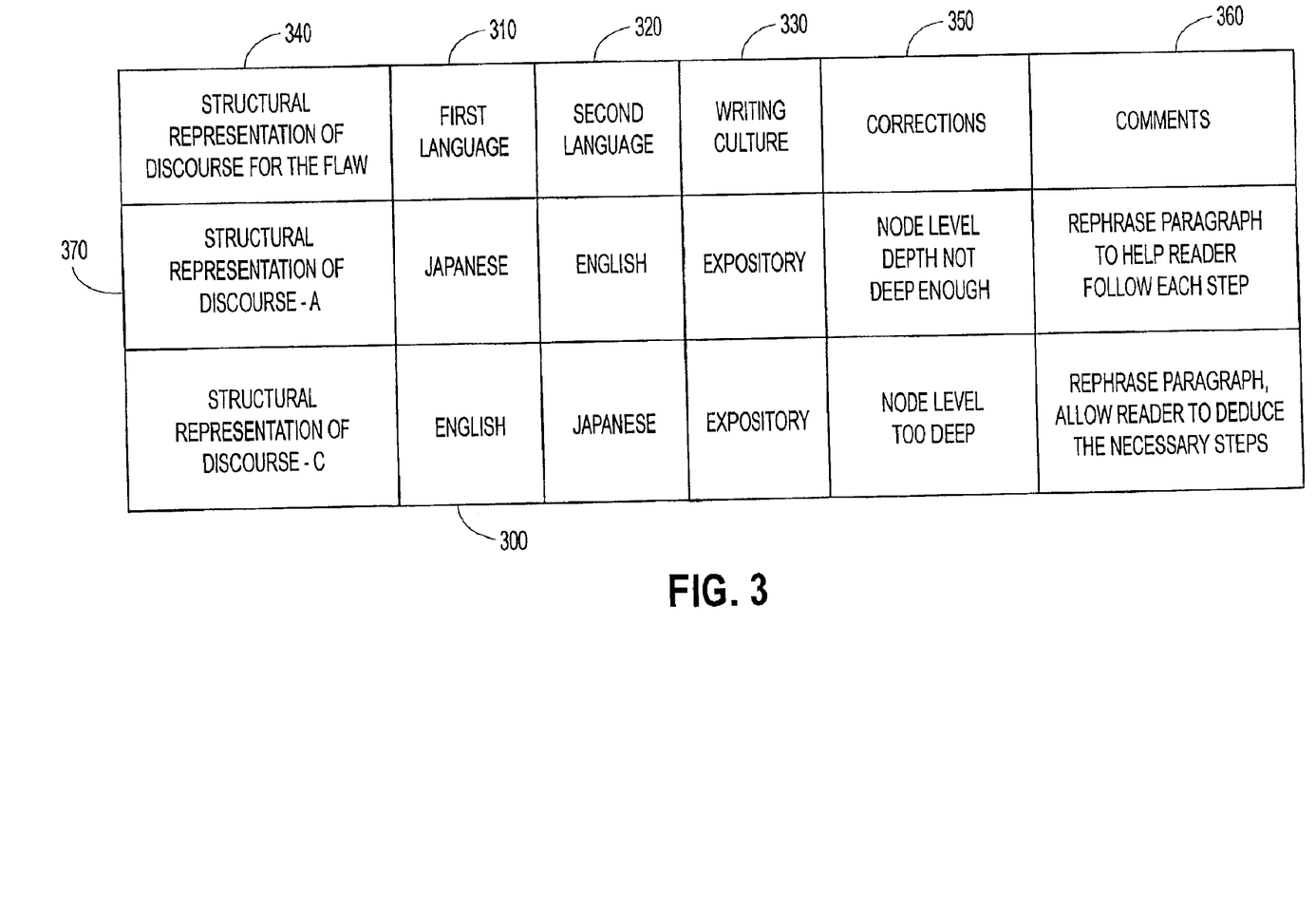
FIG. 3 shows an exemplary embodiment of a linguistic-flaw data storage structure according to this invention.

FIG. 3 shows an exemplary linguistic flaw storage data structure 300. The linguistic flaw storage data structure 300 includes a first language identifier 310, a second language identifier 320 a writing culture identifier 330, a corrections portion 350, a comments portions 360 and a structural representation of discourse 340 for the flaw.

The first language portion 310 identifies the first language of the writer, while the second language portion 320 identifies the written language the writer of the text was attempting to master. The writing culture portion 330 identifies the type of writing that the writer was attempting to master. For example, such types of writing include, but are not limited to, legal argument, medical articles, newspaper articles and/or narrative or expository writing. However, the type of writing can include any known or later developed type of writing culture. The structural representation of discourse for the flaw 340 portion of the entry contains structural representations of discourse indicative of the types of flaws second language writers tend to make when writing in the second language writing culture. There may be several entries for a given first and second language and writing culture. The structural representation of discourse for each entry 370 is compared to the structural representation of discourse for the user text.

When a structural representation of discourse 340 of a flaw matches the user's text or a component of the user's text, the corrections portion 350 is displayed to the user. The correction portion 350 of the linguistic flaw storage entry 370 may be displayed along with the structural representation of discourse for the second-language writing culture. If the user requires further explanatory information, additional information may be provided using the comments 360 portion of the entry 370. In this way, additional remedial information may be given to the user.

For example, in various exemplary embodiments of the second-language writing skills instruction system 100, the structural representation of the user text may be compared and contrasted with the structural representations of discourse for the first-language writing culture and the second-language writing culture. In various other alternative embodiments of the second-language writing instruction system 100, suggestions for transforming the structural representation of discourse are based on the problems identified in the linguistic flaw storage 180. The corrections portions 350 of the linguistic flaw storage data structure 300 may be used to store additional suggestions that could be presented to the user in a dialog box.

The comments portions 360 can be used to provide further explanation and analysis of the flaws to the user. For example, if the user requires additional explanation, a dialog box or a window can be used to display text from the comments portion 360. This information can be a fuller text description of the source of the flaw and/or alternative techniques for resolving the flaw in the second-language writing culture.

Figure 4:
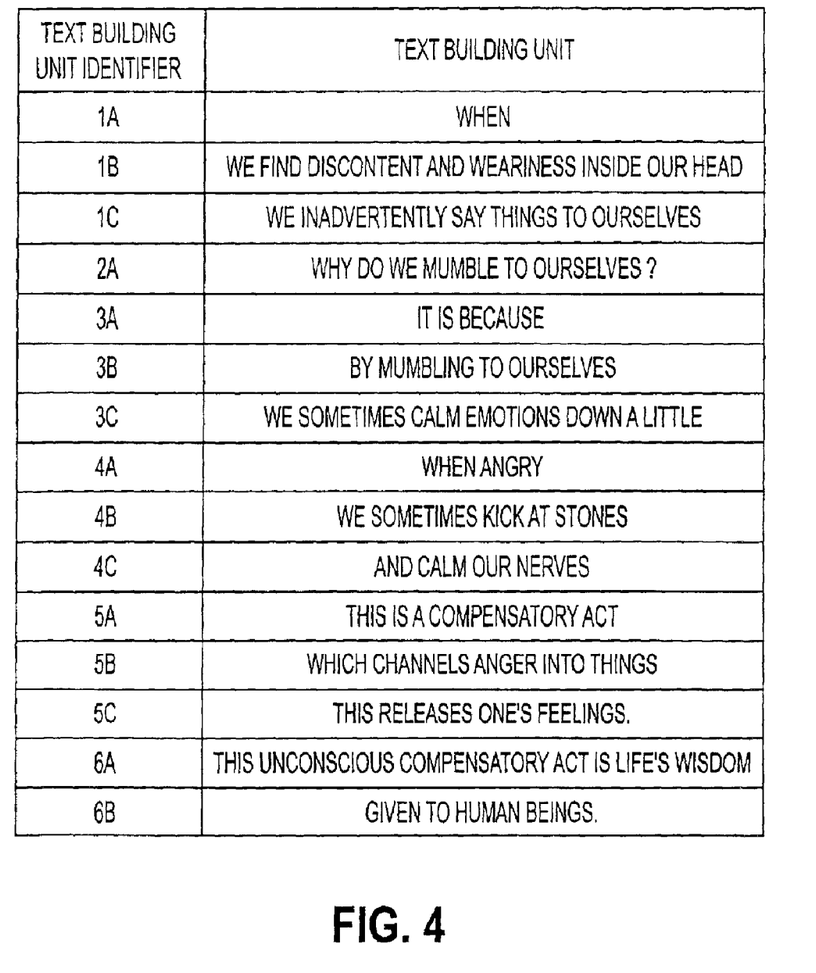
FIG. 4 shows a first exemplary user text labeled with text building units according to this invention.

FIG. 4 illustrates an English language translation of a Japanese text written in the joron-honron-ketsuron expository writing culture. The joron-honron-ketsuron expository writing culture has a distinctive three-part structure which can be seen in the associated structural representation of discourse for the text. In Japanese, this type of writing culture is also found in Japanese persuasive and narrative writing. Therefore, in various alternative embodiments according to this invention, the same structural representation of discourse may be associated with either or both of a Japanese-language persuasive writing culture and a Japanese-language narrative writing culture identifier.

Figure 5:
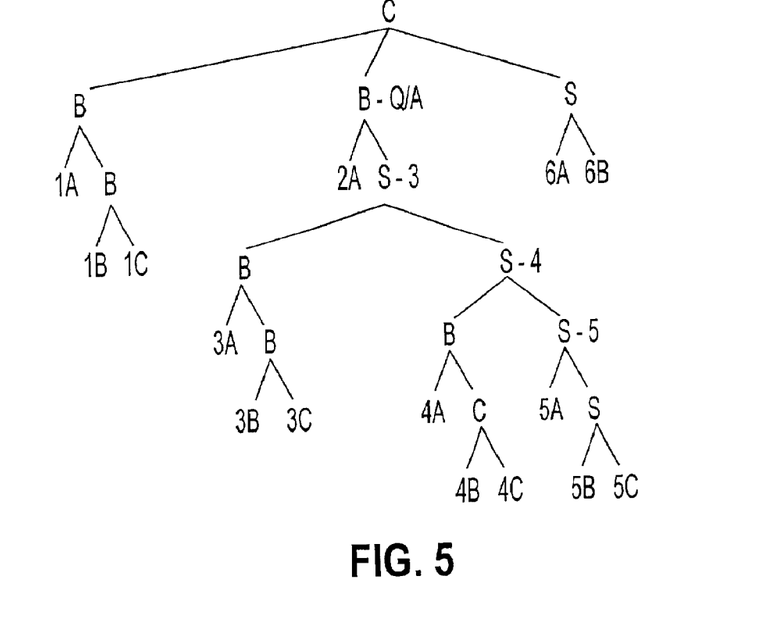
FIG. 5 shows an exemplary structural representation of discourse for a Japanese-language user's writing in Japanese using a first Japanese writing culture according to this invention.

FIG. 5 shows an exemplary structural representation of discourse for a Japanese-language text written by a Japanese-language speaker. The text conforms to the joron-honron-ketsuron expository writing culture.

Figure 6:
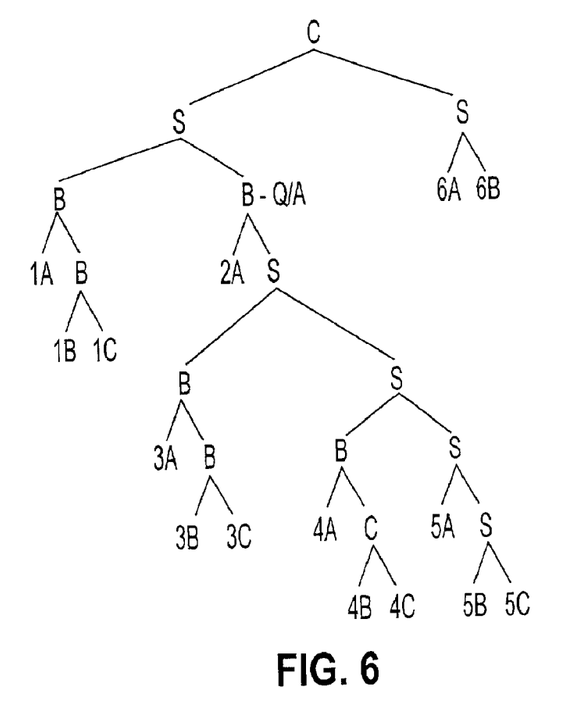
FIG. 6 shows an exemplary structural representation of discourse for a Japanese-language user writing in English using the first Japanese writing culture according to this invention.

FIG. 6 shows an exemplary structural representation of discourse for the English translation of the Japanese-language text shown in FIG. 4. When the structural representation of discourse is visualized, the long elaboration chain of text building units 2A–5C are readily identified as language-specific flaws in the organization of the written text. According to English-language conventions, this long elaboration chain is perceived as awkward and/or disorganized. Therefore, using the various embodiments of the second-language writing instruction system 100 according to this invention, a first-language reader can more easily understand the flaws in their writing through such compare and contrast techniques.

Figure 7:
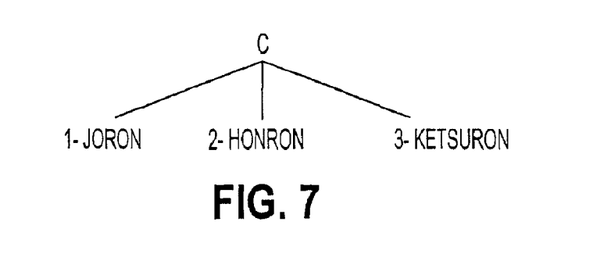
FIG. 7 shows a first structural representation of a writing culture according to this invention.

FIG. 7 shows an exemplary structural representation of discourse for a Japanese-language writing culture. The structural representation of discourse shows the overall three-part organizational feature, which is the typical feature of the joron-honron-ketsuron expository writing culture. The labels "joron", "honron" and "ketsuron" are provided for discussion purposes. The structural representation features in this example are nodes labeled 1, 2 and 3 extending from the initial coordination node. Thus, a user text must show at least the features of a coordination of three nodes to be considered as conforming to Japanese-language speakers' expectations of appropriate structure for joron-honron-ketsuron expository writing culture.

These salient features are represented in the structural representation of discourse for the writing culture. The differences between the writing-culture structural representation of discourse and the user text structural representation of discourse are readily identified. The identified differences are then compared to the structural representation of discourse 340 for each entry 370 in the linguistic flaw storage data structure 300. The differences that match entries for the first and second language and the writing culture are used to provide the user with relevant remedial instruction. The writing-culture structural representation of discourse can also be displayed to the user to visually communicate how the structural representation of discourse can be corrected.

Figure 8:
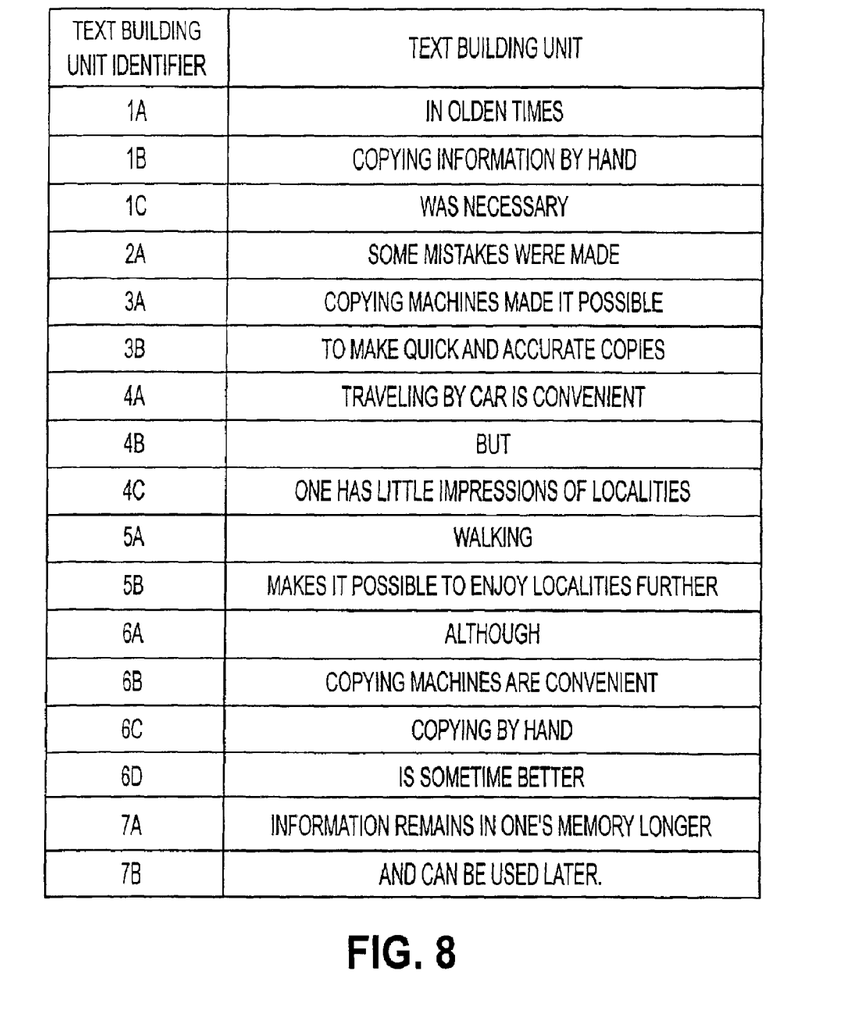
FIG. 8 shows a second exemplary user text labeled with text building units according to this invention.

FIG. 8 contains an English language translation of a Japanese text written in the ki-shoo-ten-ketsu expository writing culture. The ki-shoo-ten-ketsu expository writing culture has a distinctive four-part structure which can be seen in the associated structural representation of discourse for the text. In Japanese, this type of writing culture is found in Japanese rhetorical expository writing.

Figure 9:
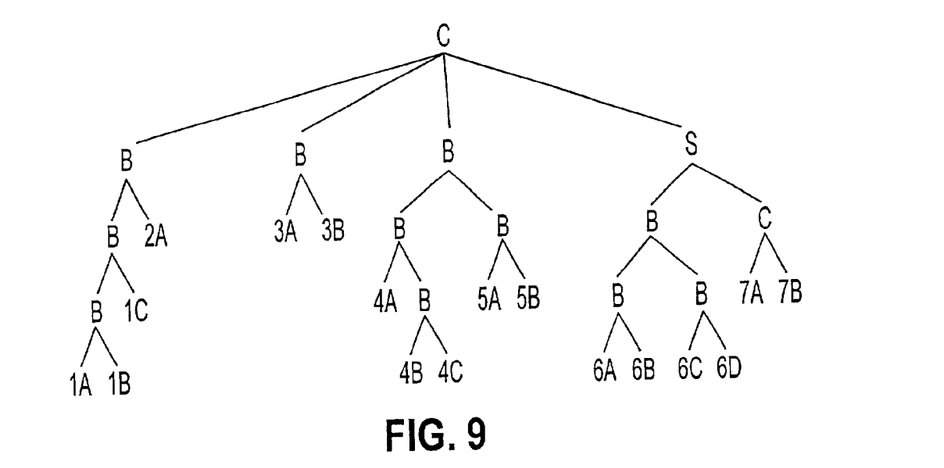
FIG. 9 shows a second exemplary structural representation of discourse for a Japanese-language user's writing in Japanese using a second Japanese writing culture according to this invention.

FIG. 9 shows an exemplary structural representation of discourse for a Japanese-language text written by a Japanese-language speaker. The text conforms to the four-part structure of the ki-shoo-ten-ketsu expository writing culture.

Figure 10:
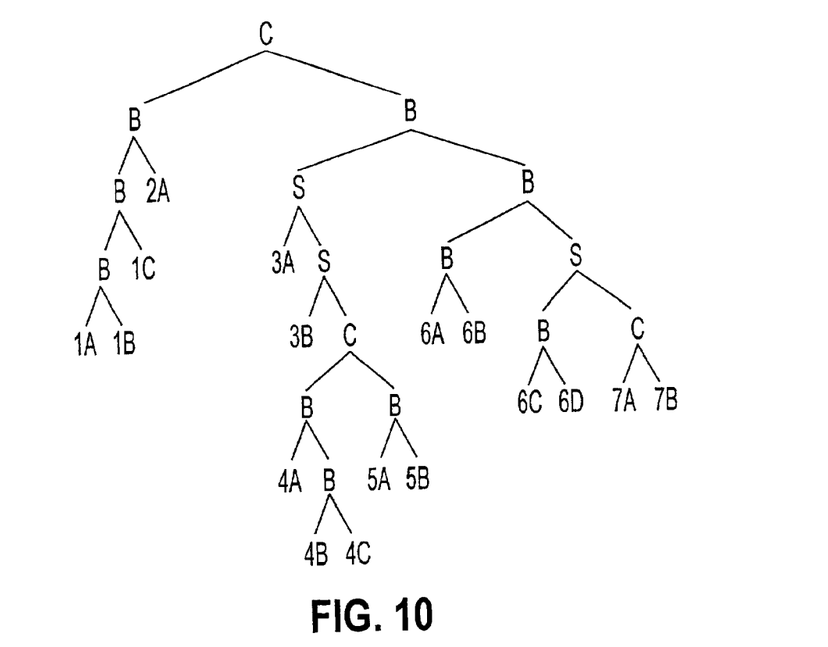
FIG. 10 shows an exemplary structural representation of discourse for a Japanese language user writing in English using the second Japanese writing culture according to this invention.

FIG. 10 shows an exemplary structural representation of discourse for the English translation of the Japanese language text shown in FIG. 8. When the structural representation of discourse is visualized, the subordination of text building units 4A–5B are readily identified as language-specific flaws in the organization of the written text. According to English-language expository writing conventions, this portion of the text is perceived as incoherent. In an attempt to coordinate the unexpected information, an English language audience subordinates the text building units 4A–5B, as displayed graphically by the structural representation of discourse. Therefore, using the various embodiments of the second-language writing instruction system 100 according to this invention, a first-language writer can more easily understand the flaws in the user's writing through such compare and contrast techniques.

Figure 11:
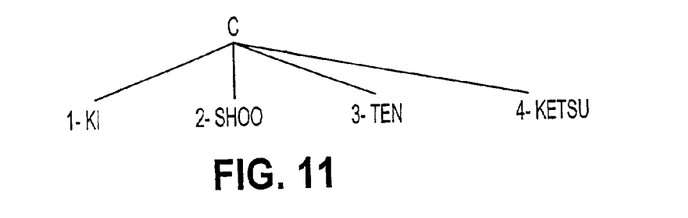
FIG. 11 shows a second exemplary structural representation of a writing culture according to this invention.

FIG. 11 shows an exemplary structural representation of discourse for a Japanese language writing culture. The structural representation of discourse shows the typical features of the ki-shoo-ten-ketsu expository writing culture. The structural representation features in this example are nodes labeled 1, 2, 3 and 4 extending from the initial coordination node. Thus, a user's text must show at least the four coordinated nodes to be considered as conforming to the ki-shoo-ten-ketsu expository writing culture, as indicated in the structural representation of discourse for the writing culture.

The differences between the writing-culture structure and the structural representation of discourse of a user text are identified. The identified differences are then compared to the structural representation portion of the linguistic flaw storage entries. As discussed above, the differences that match entries for the first and second language and the writing culture are used to provide the user with contextually relevant remedial instruction. The writing-culture structural representation of discourse may also be displayed to allow the user to visualize an overview of the necessary changes to the user text.

Figure 12:
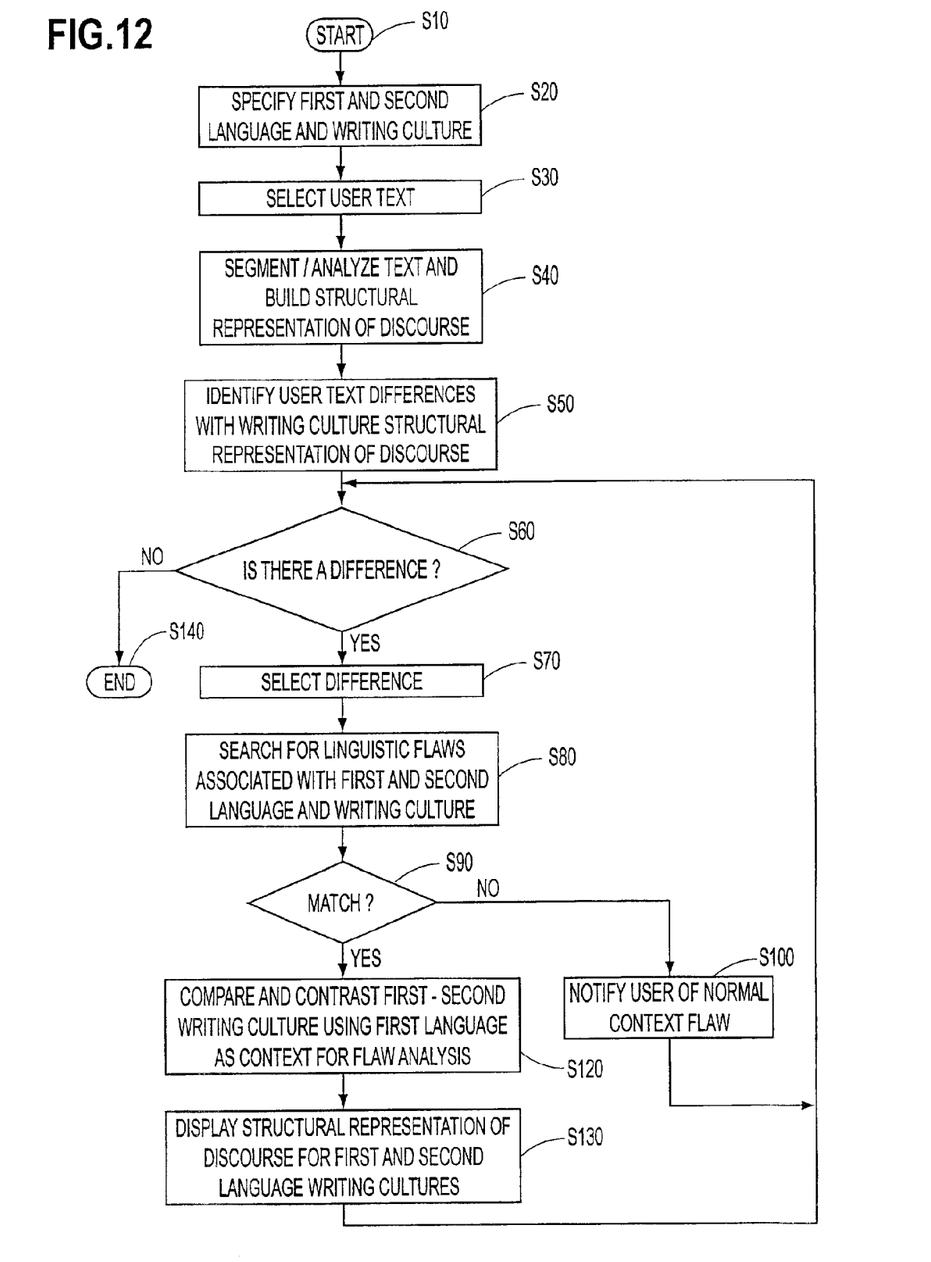
FIG. 12 is a flowchart outlining one exemplary embodiment of a second language writing instruction method according to this invention.

FIG. 12 is a flowchart outlining one exemplary embodiment of a second language writing skills instruction method according to this invention. The process starts at step S10, and continues to step S20, where the first language is specified. The first language is the language in which the user has the greatest mastery of writing skills, since this language is most likely to influence the acquisition of second language writing skills. The second language and writing culture are also specified. Next, in step S30, a user text is selected. In general, any editor or word processor may be used to create the text to be analyzed. Then, in step S40, the text is segmented, analyzed and a structural representation of discourse is generated. The process of generating the structural representation of discourse are described in the incorporated 325, 371 and 779 applications. Control then continues to step S50.

In step S50, the structural representation of discourse of the user text is compared to the structural representation of discourse for the writing culture and the differences are identified. Then in step S60, a determination is made whether any further differences exist. If no further differences are identified, control jumps to step S140 and the process ends. Otherwise, control continues to step S70, where the difference is selected. Next, in step S80, a search through the linguistic flaws associated with the first and second languages and the writing culture is made based on the identified difference. Then in step S90, a determination is made whether a match has occurred. If a match did not occur, control continues to step S100. Otherwise control jumps to step S120.

In step S100 the user is notified of the error. However, no linguistic-based revision or comment is displayed, since this type of flaw is not associated with the user's first language. After notifying the user of the error, control jumps back to step S60 where it is determined if any further differences have been identified. If additional differences are identified, steps S60–S130 are repeated as necessary.

In contrast in step S120, a textual explanation of the techniques useful in revising the specific type of flaw is displayed. Next in step S130, a comparison between the structural representations of discourse for the first-language writing culture and the second-language writing culture is displayed. This provides an overview of what changes the user needs to make. In various alternative embodiments, the identified flaws in the user text and/or the user text structural representation of discourse may be highlighted in a different color to draw the user's attention to the problem. However, any known or later developed technique of highlighting or otherwise identifying identified flaws may be used to provide overview information to the user. Control then jumps back to step S60 and one or more of steps S60–S130 are repeated as necessary until it is determined that no further differences exist.

Figure 13:
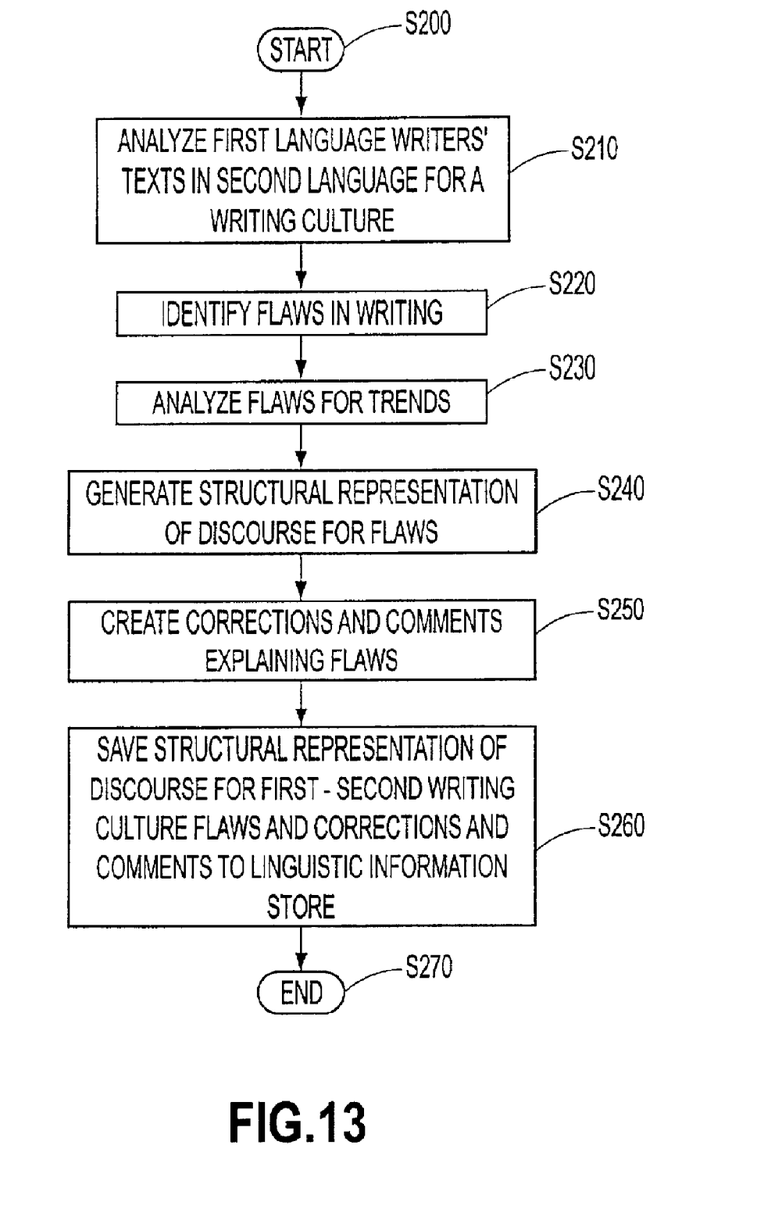
FIG. 13 is a flowchart outlining one exemplary embodiment of a method for generating a writing-culture generic structure according to this invention.

FIG. 13 is a flowchart outline one exemplary embodiment of a method for generating a writing outline generic structure. according to this invention. The process starts at step S200 and continues to step S210, where a group of second-language texts of first-language writers is analyzed. Then, in step S220, flaws in the writing are identified. The flaws may be identified by any known or later-developed technique for analyzing texts, such as, for example, analyzing the texts using a theory of discourse analysis, such as the Linguistic Discourse Model, Rhetorical Structures Theory or any other known or later-developed theory of discourse analysis. Control then continues to step S230.

In step S230, the identified flaws are analyzed to determine if a trend exists. For example, a statistical test may be used to determine whether a relationship exists between the first and second language, the writing culture and the identified errors. Next in step S240, a structural representation of discourse for the flaw is generated. The structural representation of discourse for the flaw may then be used to identify the existence of the flaw in the structural representation of discourse of other texts. Control then continues to step S250.

In step S250, revisions and comments explaining the source of the flaw in the first language writing culture, and how to revise the flaw in the second language writing culture, are entered. The revisions may be in the form of transformations to be applied to the structural representations of discourse, textual material, graphics or any known or later-developed technique for representing how to correct the flaw. Next, in step S260 the first and second language, the writing culture, the revisions, comments and the structural representation of discourse are saved. Control then continues to step S270, where the process ends.

It should be understood that the expository writing teaching system 100 can be implemented on a programmed general purpose computer. However, the expository writing teaching system 100 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIG. 12 and 13 may be used to implement the second language writing skills instruction system 100.

In various exemplary embodiments, the memory 120 and text storage memory 170 are implemented using static or dynamic RAM. However, the memory can also be implemented using a floppy disk and disk drive, a write-able optical disk and disk drive, a hard drive, flash memory or the like.

It should be understood that each of the circuits in FIG. 1 can be implemented as portions of a suitable programmed general purpose computer. Alternatively, each of the circuits shown in FIG. 1 can be implemented as physically distinct hardware circuits within an ASIC, or using a FPGA, a PDL, a PLA, or a PAL, or using discrete logic elements.

Moreover, the second language writing skills instruction system 100 can be implemented as software executing on a programmed general purpose computer, a special purpose computer, a microprocessor or the like. In this case, the second language skills instruction system 100 can be implemented as a routine embedded in an computer, as a resource residing on a server, or the like. The second language skills instruction system 100 can also be implemented by physically incorporating it into a software and/or hardware system, such as the hardware and software systems of a personal computer system.

It will be apparent that the processing circuits or routines of the second language writing skills instruction system 100 may be used in collaborative networked learning environments in which some or all of the components of the system 100, including the circuits or routines, may be distributed throughout the network collaborative environment or may be centrally located. The environment may include web servers, application servers, or any other type of computer system. In general, the system may be used alone or in combination with any number of other general programmable or special purpose computers or components and in any type of environment including networked collaborative learning environments, client server environments and web based environments.

Modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for teaching second-language writing skills using a user-written second-language document, comprising:

selecting a first language of a user, a second language of instruction for the user and a writing culture;

analyzing the second-language document using a theory of discourse analysis;

identifying at least one flaw in the second-language document based on the writing culture; and displaying contextually relevant remedial information including a graphically structural representation of discourse for at least one of the at least one identified flaws.

2. The method of claim 1, wherein the second-language document is analyzed to identify differences with the writing culture.

3. The method of claim 2, wherein flaws in the second-language document are identified based on the writing culture and previously identified flaws for documents written in the second language and on the selected writing culture when written by first-language writers.

4. The method of claim 3, wherein flaws in the second-language document are identified based on differences with the selected writing culture and similarity to at least one previously-identified flaw for documents written in the second language and on the selected writing culture when written by first-language writers.

5. The method of claim 1 wherein the remedial information is a structural representation of discourse for at least one of the first-language writing culture, the second-language writing culture and the at least one previously-identified flaw.

6. A system useable to teach second-language writing skills using a second-language user document, comprising:

an input device;

an analyzing circuit routine or manager;

a linguistic flaw memory;

a writing culture memory; and a controller that selects a first language, a second language and a writing culture from the input device, analyzes the second-language user document according to a theory of discourse, identifies at least one flaw in the second-language document and displays contextually relevant remedial information including a graphically structural representation of discourse for at least one of the at least one identified flaw.

7. The system of claim 6, wherein the controller identifies differences between the second-language document and the writing culture.

8. The system of claim 7, wherein the controller identifies flaws in the second language document based on the writing culture and previously-identified flaws for second-language writing documents written by first-language writers.

9. The system of claim 8, wherein the controller identifies flaws in the second-language document based on differences with the writing culture and based on similarity to at least one previously-identified flaws for documents written in the second language and on the selected writing culture when written by first-language writers.

10. A method for analyzing linguistic flaws in second language documents comprising:

analyzing a group of documents written by first language speakers in a second language for a writing culture;

identifying flaw trends based on the first language, the second language and the writing culture;

generating a structural representation of discourse for each identified flaw trend;

creating flaw revision information for each identified flaw trend;

saving the structural representation of discourse and the flaw revision information for each identified flaw trend in a flaw information store.

11. A method for analyzing linguistic flaws in a document translated from a first language to a second language:

selecting the writing culture of the translated document;

analyzing the translated document using a theory of discourse analysis;

identifying at least one flaw in the translated document based on the writing culture; and displaying contextually relevant remedial information including a graphically structural representation of discourse for at least one of the at least one identified flaws.

* * * * *